United States Patent [19]

Ernst

[11] 4,240,571
[45] Dec. 23, 1980

[54] CAR TOP CARRIER

[75] Inventor: M. Eric Ernst, Royal Oak, Mich.

[73] Assignee: Pivot Manufacturing Company, Detroit, Mich.

[21] Appl. No.: 69,594

[22] Filed: Aug. 24, 1979

[51] Int. Cl.³ .............................................. B60R 9/00
[52] U.S. Cl. .................................... 224/310; 224/321; 414/462
[58] Field of Search ................. 224/310, 321; 414/462

[56] References Cited

U.S. PATENT DOCUMENTS

| 2,180,032 | 11/1939 | Casley . | |
|---|---|---|---|
| 2,318,971 | 5/1943 | Roumage et al. . | |
| 2,395,173 | 2/1946 | Dobler . | |
| 2,448,591 | 9/1948 | Harder . | |
| 2,479,035 | 8/1949 | Burkey . | |
| 2,492,841 | 12/1949 | Burkey . | |
| 2,613,020 | 10/1952 | Berry . | |
| 2,946,397 | 7/1960 | Berberich | 414/462 X |
| 3,495,729 | 2/1970 | Kruse . | |
| 3,672,549 | 6/1972 | Chorey | 224/310 |
| 3,878,955 | 4/1975 | Udden | 224/310 X |
| 3,963,136 | 6/1976 | Spanke . | |
| 4,003,485 | 1/1977 | Edgerton | 414/462 |
| 4,039,096 | 8/1977 | McAllister | 224/310 X |
| 4,063,659 | 12/1977 | Welch | 224/310 X |
| 4,081,095 | 3/1978 | Wilburn et al. . | |

Primary Examiner—Steven M. Pollard
Attorney, Agent, or Firm—Whittemore, Hulbert & Belknap

[57] ABSTRACT

A vehicle top carrier comprising a carrier frame mounted on track structure for movement from a generally horizontal carrying position atop the vehicle to a substantially inclined loading and unloading position to one side of the vehicle. A strut has its upper end pivoted to the carrier frame. Its lower end has a pivot block which is slidably mounted on a vertical guide on the side of the vehicle. This pivot block is at the bottom of the slide when the carrier frame is in the loading and unloading position. It is raised to the top of the slide to raise the carrier frame from the loading and unloading position to an intermediate position of lesser inclination from which the carrier frame may be easily moved to the carrying position.

7 Claims, 9 Drawing Figures

U.S. Patent Dec. 23, 1980 Sheet 1 of 5 4,240,571
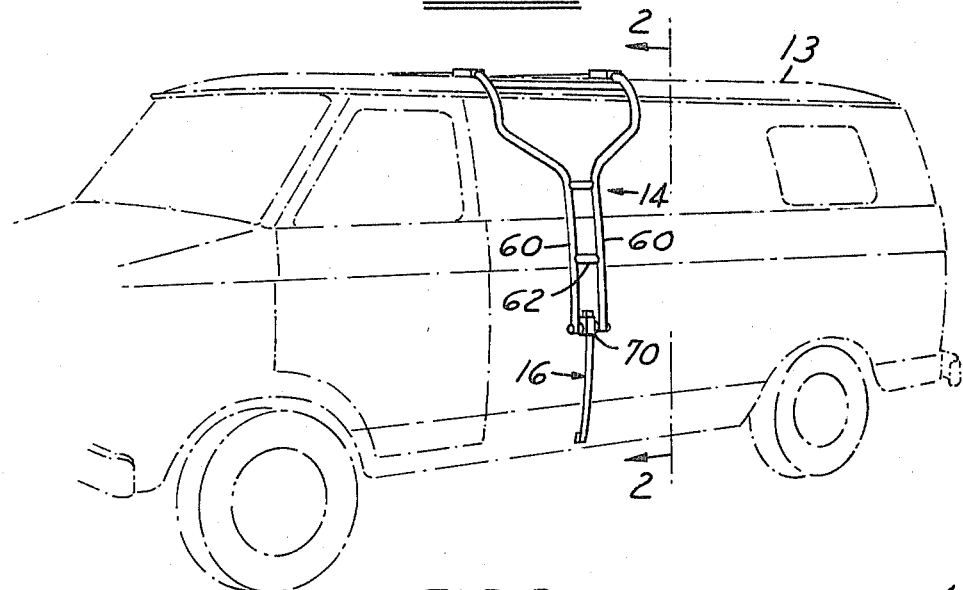
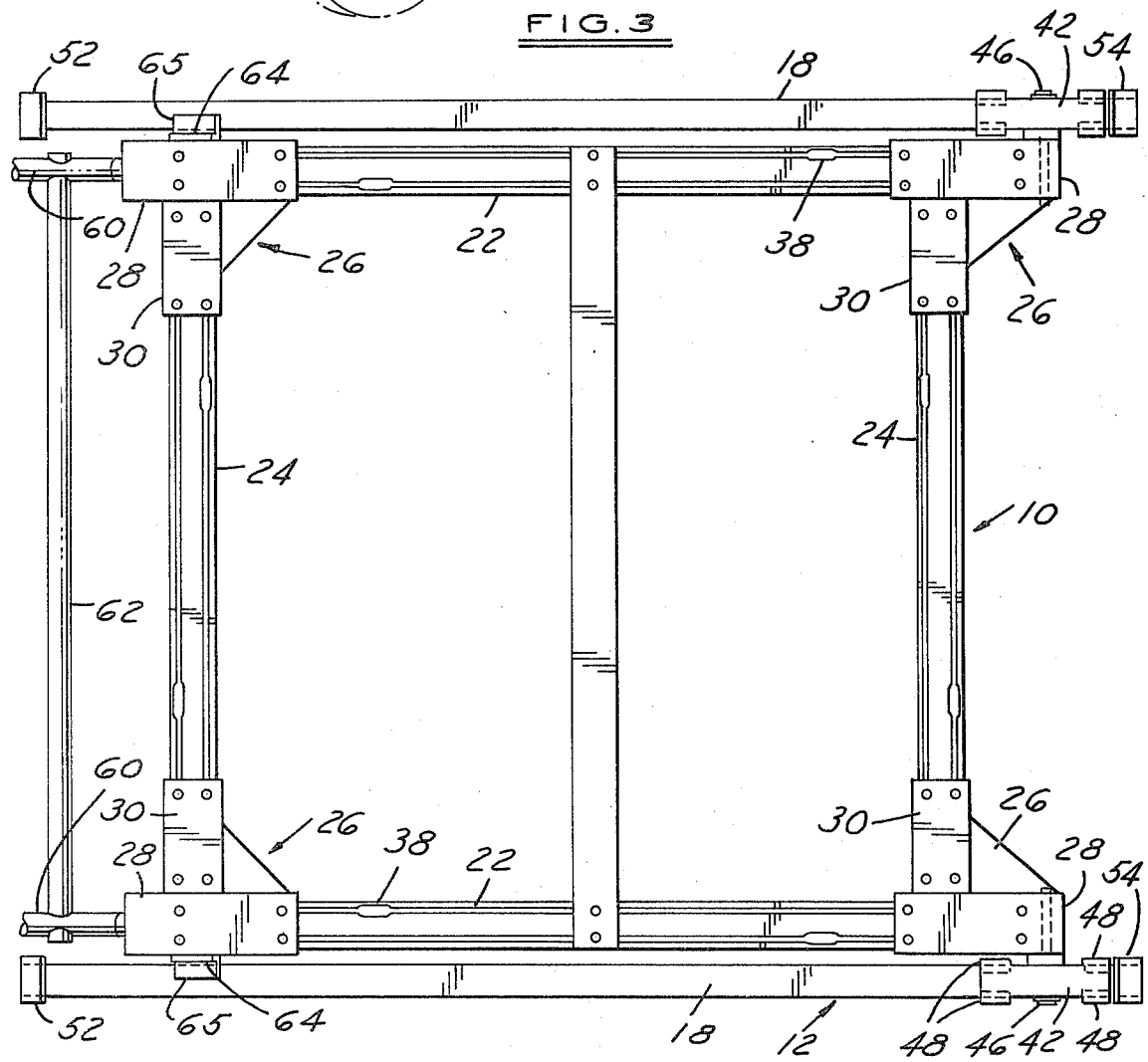

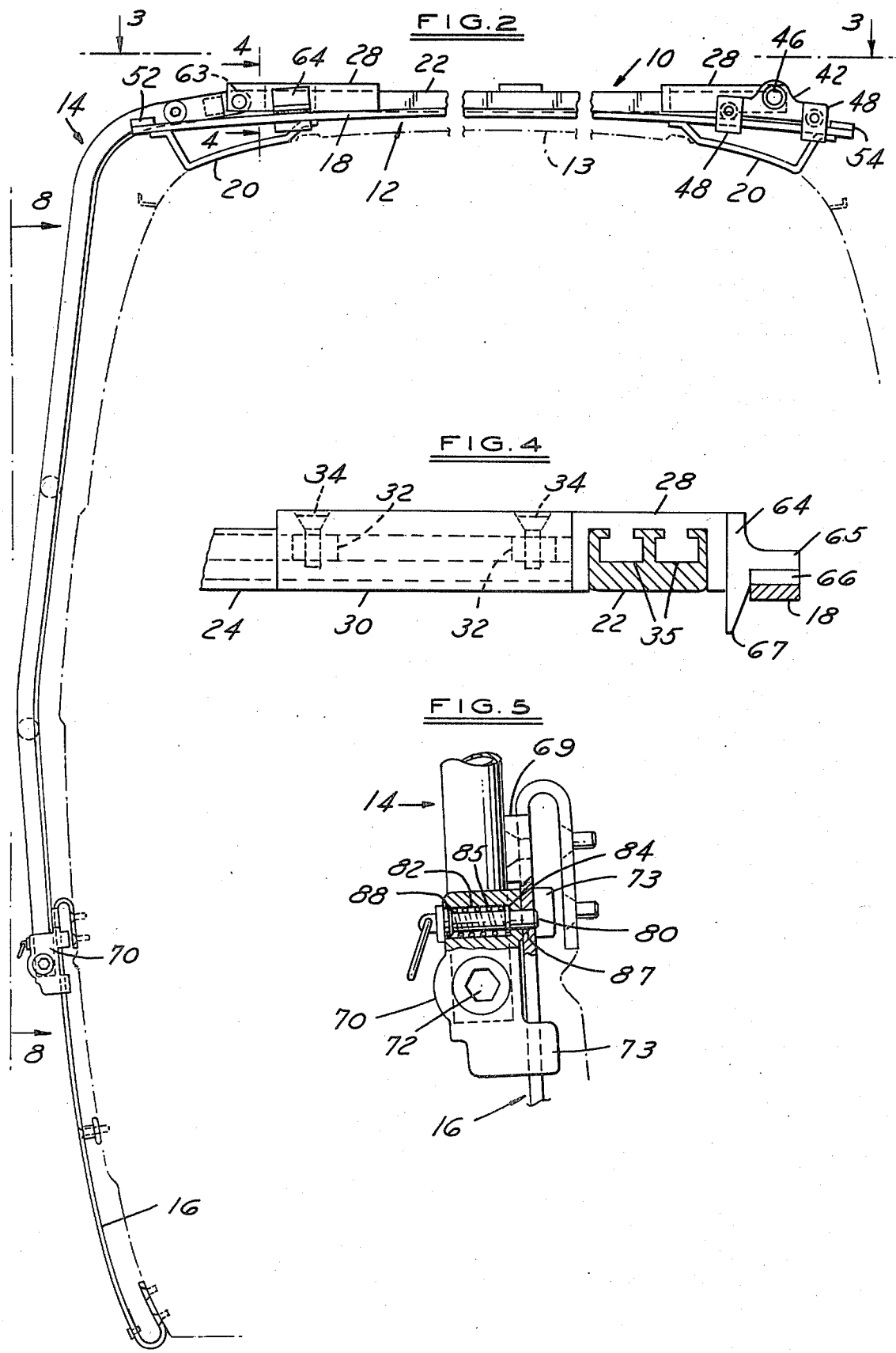

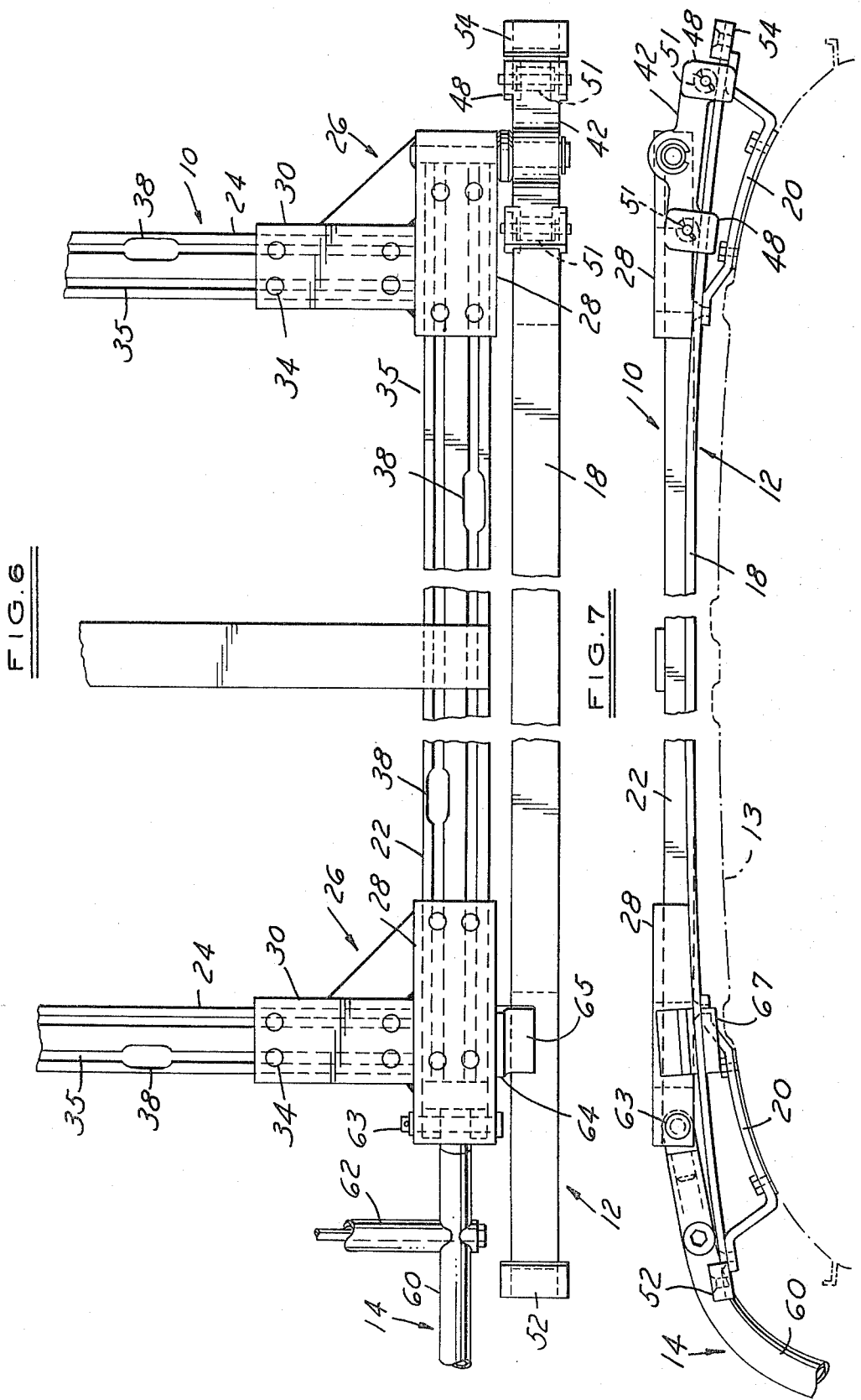

CAR TOP CARRIER

This invention relates generally to a vehicle top carrier for luggage and the like.

One object of the invention is to provide an improved vehicle top carrier which is easy to load and unload.

In accordance with the invention, the vehicle top carrier may comprise a carrier frame adapted to support luggage and the like mounted on track structure for movement from a generally horizontal carrying position on the top of the vehicle to a substantially inclined loading and unloading position at one side of the vehicle. A strut has its upper end pivoted to the carrier frame. A pivot block on the lower end of the strut is slidably mounted on a vertical guide mounted on the side of the vehicle.

The pivot block is locked at the top of the slide when the carrier frame is in the carrying position. It is at the bottom of the slide when the carrier frame is in the inclined loading and unloading position. It may be raised to the top of the slide to raise the carrier frame from the loadng and unloading position to an intermediate position of lesser inclination from which the carrier frame may be easily moved to the carrying position.

BRIEF DESCRIPTION OF THE DRAWINGS

Other objects and features of the invention will become more apparent as the description proceeds especially when considered with the accompanying drawings, wherein;

FIG. 1 is a perspective view of a Van type vehicle having the carrier structure of my invention mounted thereon.

FIG. 2 is a view of the carrier frame in the carrying position, as seen on line 2—2 in FIG. 1.

FIG. 3 is a top plan view of the carrier frame as seen on line 3—3 in FIG. 2.

FIG. 4 is a fragmentary sectional view taken on the line 4—4 in FIG. 2.

FIG. 5 is an enlarged fragmentary view with parts in section of a portion of FIG. 2.

FIG. 6 is an enlarged fragmentary view of a portion of FIG. 3.

FIG. 7 is an elevational view of the carrier frame in carrying position on the track structure.

DETAILED DESCRIPTION

Figure 8:
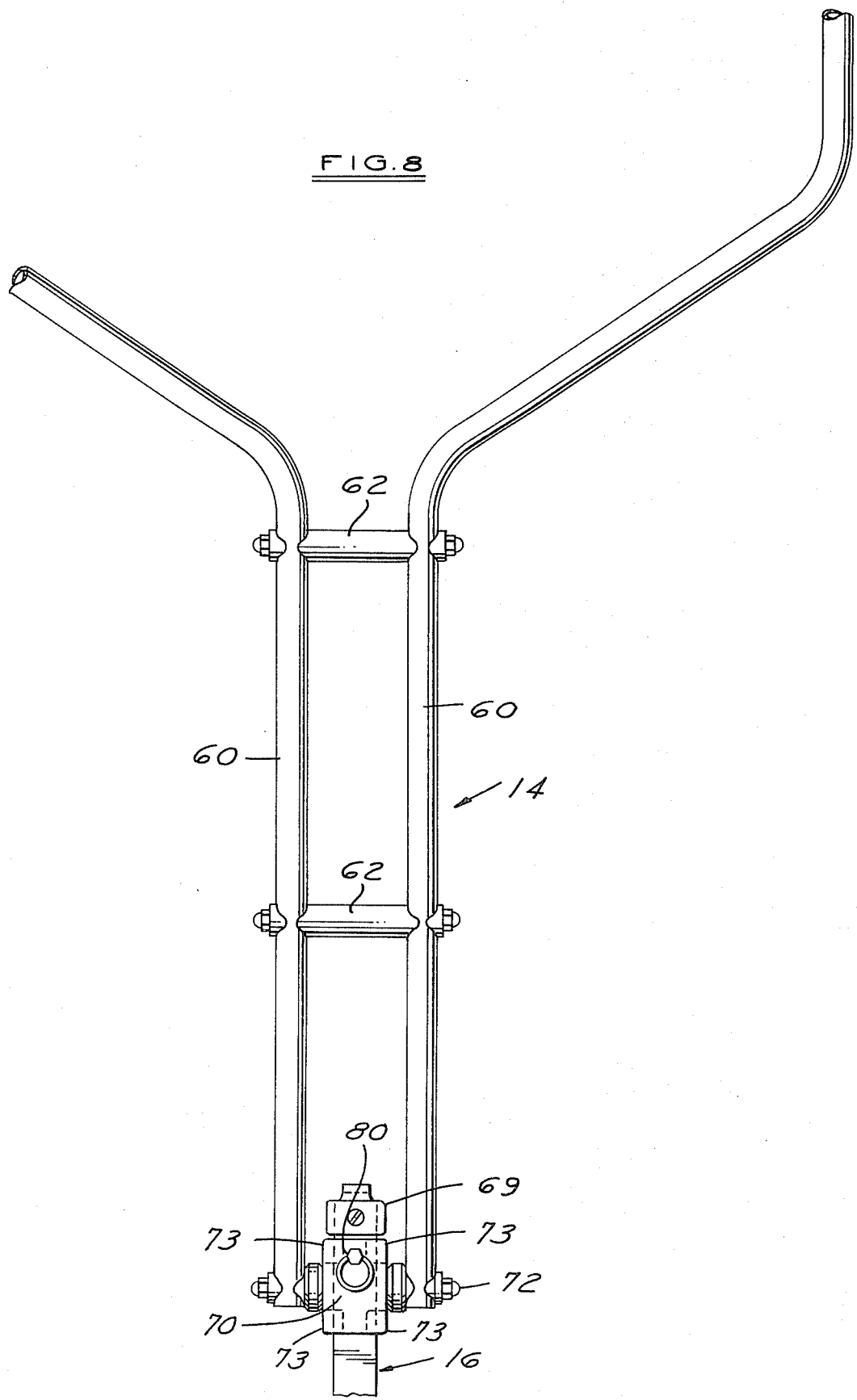
FIG. 8 is a view taken on the line 8—8 in FIG. 2.

Referring now more particularly to the drawings, a vehicle top carrier constructed according to this invention is shown mounted on a vehicle of any suitable type but which in this instance is of the Van type. The vehicle top carrier comprises a carrier frame 10, track structure 12 mounted on the top 13 of the vehicle, a strut 14 having its upper end pivoted to the carrier frame, and a guide 16 on the side of the vehicle to which the lower end portion of the strut 14 is pivoted.

The track structure 12 may comprise a pair of parallel tracks 18 shown as being in the form of simple metal bars or strips which extend cross-wise of the vehicle, preferably at right angles to the longitudinal center line thereof. These tracks 18 are spaced apart longitudinally of the vehicle as shown and are secured to the top surface of the vehicle as by means of suitable brackets 20. Preferably the ends of the tracks terminate adjacent to the opposite sides of the vehicle so that the tracks are centered laterally over the vehicle.

The carrier frame 10 is generally in the form of a rectangle, having the laterally spaced parallel side bars 22 and the longitudinally spaced parallel end bars 24. The side and end bars 22 and 24 are rigidly secured together at the corners by the block assemblies 26 each consisting of two welded blocks 28 and 30. The blocks 28 are secured to the side bars 22 by nuts and bolts 32, 34 and the blocks 30 are secured to the end bars 24 by similar nuts and bolts 32, 34. Although other specific means may be employed, it will be noted that in this instance the side and end bars are formed with channels 35 in which the nuts are slidably positioned and retained against rotation, these channels having enlargements 38 for the insertation and removal of the nuts.

A pair of casters 42 are mounted on the side of the carrier frame remote from the strut 14, at opposite sides thereof. The casters are pivoted to the blocks 28 on horizontal pins 46. These casters are adapted to slide on the respective tracks, and for this purpose each caster has depending laterally spaced L-shaped flanges 48 which straddle the tracks and terminate beneath the tracks so that the casters may slide freely on the tracks but are prevented from separating therefrom. These casters also have rollers 51 over the tops of the tracks to hold the casters down on the tracks and prevent vibration. Stops 52 and 54 at the opposite ends of the tracks determine the limits of travel of the casters.

A pair of supports 64 are mounted on the side of the carrier frame adjacent to strut 14 at opposite sides thereof. These supports are preferably welded or otherwise secured to blocks 28 and have laterally outwardly extending, horizontal flanges 65 provided with anti-friction pads 66 on the under surface in slidable engagement with the top surfaces of tracks 18. The supports 64 also have downwardly extending flanges 67 along the inner edges of tracks 18 which retain the carrier frame from moving laterally but permit it to lift away or separate from the tracks.

The strut 14 has the laterally spaced side bars 60 and the connecting bars 62. The upper ends of these side bars are pivoted to the adjacent side of the carrier frame by horizontal pins 63 mounted on blocks 28.

The guide 16 mounted on the side of the vehicle is a vertical metal rail or bar. Stop 69 is at the top of the guide. The return bent lower end of the guide bar forms a lower stop. There is a pivot block 70 pivoted to the lower end of the strut between the side bars thereof on a pin 72. This pivot block has laterally spaced, L-shaped flanges 73 which extend along the side edges of and behind the guide bar 16 to enable the pivot block to slide up and down but preventing it from becoming separated from the guide bar. This pivot block has a detent in the form of a pin 80 which is axially slidably mounted in a hole 82 in the pivot block. The pin has a collar 84 against which a compression coil spring 85 presses, normally urging the pin to the extended position shown in FIG. 5, in which position it may extend through a hole 87 near the upper end of the guide bar 16. The opposite end of the spring 85 bears against an abutment 88 on the pivot block.

In the operation and use of the vehicle top carrier, the carrier frame 10, when in carrying position, is disposed upon the tracks 18 with its casters at or near abutting engagement with the stops 54 and with supports 64 resting on the tracks. In this position, shown in FIGS. 1, 2, 6 and 7, the pivot block 70 of strut 14 is near stop 69 at the upper end of the guide. In fact, the pivot block should be positioned so that its detent pin 80 projects through the hole 87 in the guide bar, thereby locking the carrier frame 10 in the carrying position.

Figure 9:
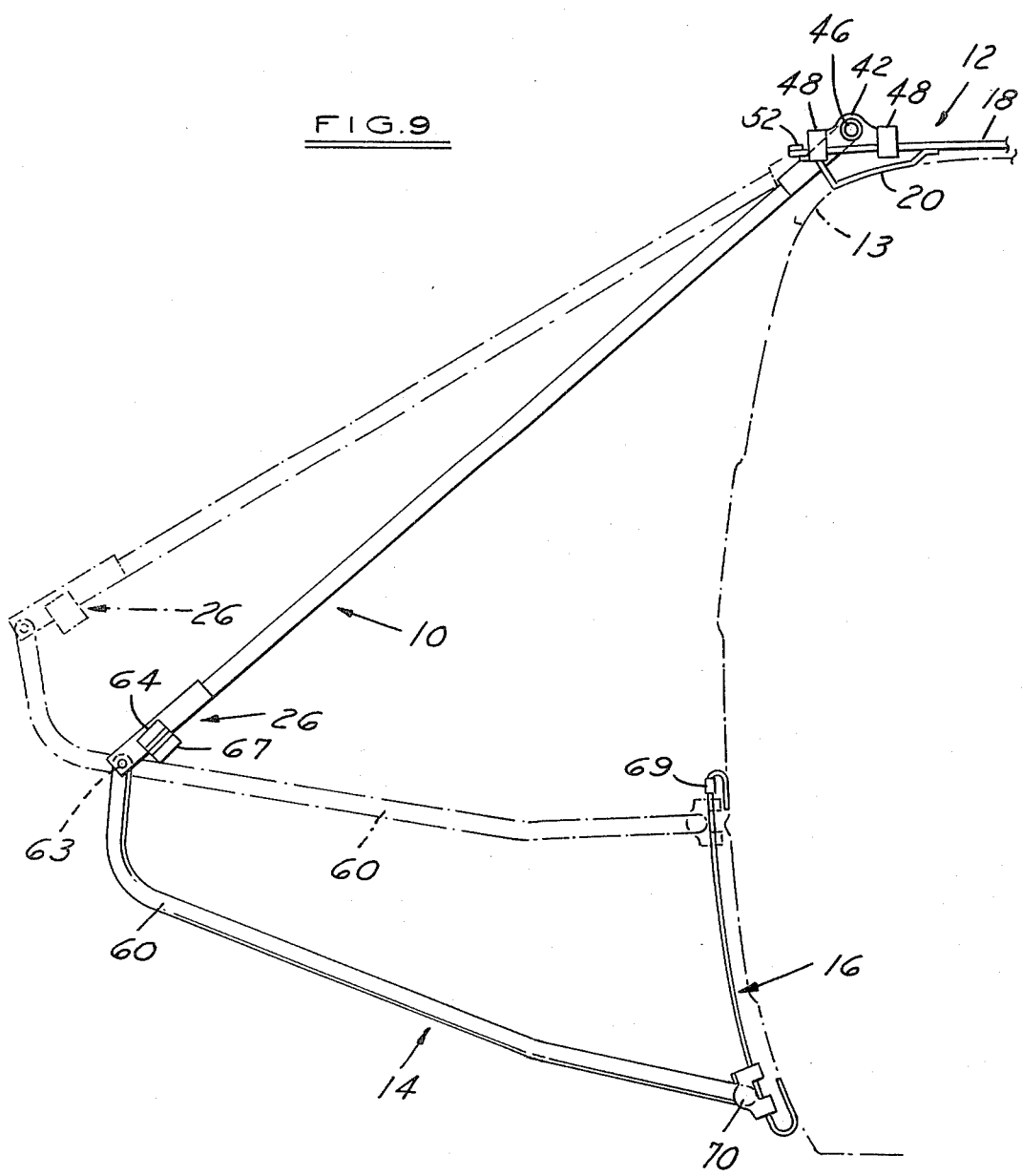
FIG. 9 is a view showing the carrier frame and strut in solid lines in the inclined loading and unloading position, and in dotted lines in an intermediate position in which the carrier frame assumes a position of lesser inclination for easy movement to a full carrying position.

The solid line position in FIG. 9 shows the carrier frame 10 disposed at a substantial angle to one side of the vehicle, at which time the pivot block at the lower end of the strut is at the very bottom of the guide bar 16 which forms a stop for the guide block. This is the substantially inclined position for loading and unloading the carrier frame with luggage and the like. In this position, the supports 64 on the carrier frame have separated from tracks 18 and casters 42 engage stops 52. The carrier frame may be moved from carrying position to the loading and unloading position by releasing the detent pin 80 and manually pulling on strut 14.

When the carrier frame 10 is ready to be moved back to the top of the vehicle, it is recommended that first the pivot block 70 at the lower end of the strut be raised to the dotted line position in FIG. 9 and then locked in that position by the detent pin 80. This movement of the strut elevates the carrier frame 10 to the dotted line position of FIG. 9 where it is disposed at a lesser angle to the horizontal. From this intermediate position, it is relatively easy to push the carrier frame back to a full carrying position on the tracks 18, shown in FIG. 2.

The described structure including pin 80 is sufficient to retain the carrier frame in the carrying position under most conditions. However if additional security is desired, the carrier frame may be tied to tracks 18 as by ropes, for example.

I claim:

1. A vehicle top carrier comprising track structure, means for mounting said track structure on the top of a vehicle, a carrier frame adapted to support luggage and the like and mounted on said track structure for movement from a generally horizontal carrying position atop the vehicle to a substantially inclined loading and unloading position laterally displaced from the top of the vehicle, a strut having its upper end pivoted to said carrier frame, a guide, means for mounting said guide in vertical position on said vehicle below said track structure, and pivot means on the lower end of said strut mounted on said guide for upward and downward movement.

2. A vehicle top carrier as defined in claim 1, including means for securing said carrier frame in carrying position.

3. A vehicle top carrier as defined in claim 1, including stops on said track structure preventing movement of said carrier frame in one direction beyond said carrying position and in the opposite direction beyond said loading and unloading position.

4. A vehicle top carrier as defined in claim 1, including a stop on said guide for limiting the downward movement of said pivot means, said strut, when said pivot means engages said stop, supporting said carrier frame in said loading and unloading position, said pivot means occupying an upper position on said guide spaced above said stop in the carrying position of said carrier frame.

5. A vehicle top carrier as defined in claim 4, including means for releasably securing said pivot means in said upper position.

6. A vehicle top carrier as defined in claim 4 or 5, wherein said strut may be employed to elevate said carrier frame from said substantially inclined loading and unloading position to an intermediate position of lesser inclination from which it may be more easily moved to said carrying position, by raising said pivot means above said stop.

7. A vehicle top carrier as defined in claim 6, including stops on said track structure preventing movement of said carrier frame in one direction beyond said carrying position and in the opposite direction beyond said loading and unloading position.

* * * * *